United States Patent
Hannah

(10) Patent No.: US 6,912,794 B2
(45) Date of Patent: Jul. 5, 2005

(54) BRICKLAYER'S COMBINATION LEVEL AND PLUMB

(76) Inventor: Joseph Hannah, 40 Winchester Avenue, Liverpool (GB), L1O-3J2

( * ) Notice: Subject to any disclaimer, the term of this patent is extended or adjusted under 35 U.S.C. 154(b) by 0 days.

(21) Appl. No.: 10/853,661

(22) Filed: May 26, 2004

(65) Prior Publication Data

US 2005/0000101 A1 Jan. 6, 2005

(51) Int. Cl.[7] .............................................. G01C 9/00
(52) U.S. Cl. ............................ 33/404; 33/365; 33/374; 33/405; 33/451
(58) Field of Search .................... 33/353, 354, 365, 33/374, 375, 376, 379, 404, 405, 406, 415, 418, 419, 451, 452, 464, 465, 479, 518

(56) References Cited

U.S. PATENT DOCUMENTS

| | | | |
|---|---|---|---|
| 613,946 A | | 11/1898 | Starrett |
| 888,070 A | * | 5/1908 | Dissell .......................... 33/464 |
| 1,307,130 A | * | 6/1919 | Karadaghli ................... 33/375 |
| 1,435,054 A | | 11/1922 | Drummond |
| 2,727,314 A | | 12/1955 | Dossie et al. |
| 2,807,888 A | * | 10/1957 | Thomas ........................ 33/374 |
| 3,686,768 A | | 8/1972 | Humbert |
| 3,724,087 A | | 4/1973 | Ostrager |
| 3,783,525 A | | 1/1974 | Bloxom |
| 4,099,331 A | | 7/1978 | Peterson et al. |
| D268,909 S | | 5/1983 | Doan |
| 4,599,805 A | * | 7/1986 | Padilla ......................... 33/464 |
| 4,910,876 A | * | 3/1990 | Channell ...................... 33/374 |
| 4,964,219 A | | 10/1990 | Clark |
| 4,999,921 A | | 3/1991 | Bird et al. |
| 5,353,509 A | * | 10/1994 | Black ........................... 33/451 |
| 5,408,752 A | * | 4/1995 | Eadens ......................... 33/376 |
| 5,442,864 A | | 8/1995 | Erman |
| 5,446,969 A | * | 9/1995 | Terenzoni ..................... 33/419 |
| 5,713,135 A | | 2/1998 | Acopulos |
| 5,832,618 A | * | 11/1998 | Scarborough ................ 33/451 |
| 5,933,974 A | | 8/1999 | Walters et al. |
| 6,105,266 A | * | 8/2000 | Cote ............................. 33/451 |
| 6,442,853 B1 | * | 9/2002 | Hale et al. .................... 33/365 |
| 6,463,666 B1 | | 10/2002 | Szumer |
| 6,615,500 B2 | * | 9/2003 | Hale et al. .................... 33/365 |

* cited by examiner

Primary Examiner—Christopher W. Fulton
Assistant Examiner—Madeline Gonzalez
(74) Attorney, Agent, or Firm—Donald R. Schoonover

(57) ABSTRACT

A bricklayer's combination level and plumb having a first I-section beam, a second I-section beam, and a connector pivotally and slidably connecting the second I-section beam to the first I-section beam wherein the second I-section is angularly displaceable up to and including a right angle relative to the first I-section beam.

1 Claim, 4 Drawing Sheets

BRICKLAYER'S COMBINATION LEVEL AND PLUMB

BACKGROUND OF THE INVENTION

1. Field of the Invention

The present invention concerns combination level and plumbs, and in particular combination level and plumbs for use in the building industry.

2. Discussion of the Related Art

Building brick walls can be difficult and time consuming, since accuracy can be of paramount importance. For example, when building any substantial structure, such as a house, it is important that the walls are vertical, and/or arranged exactly in accordance with the architect's plans. Failure to do this may result in the structure becoming unstable, eventually leading to degradation of the appearance and/or safety of the building.

Building walls vertically has traditionally been achieved by using a "plumb line," which is a cord suspended from its upper end, which supports a weight attached to its lower end. Gravity causes the center of gravity of the weight to lie vertically beneath the point of suspension. The line of the cord, can therefore, be used as a guide against which the wall can be built.

In order to build a level wall, it is necessary for each layer or "course" of bricks to be level. This has traditionally been achieved by laying a spirit level on each course and tapping the bricks to bring them into alignment with the spirit level. Spirit levels are commonplace and require no further explanation.

Additional guides, commonly used by the builder include tri-squares and laser-sighting apparatus. There are a number of difficulties commonly encountered with any of the aforementioned items namely:

(a) they are independent of one another, and it is not therefore easy to make "spot checks" on the accuracy of the alignment of say, a single brick, or the "squareness" of a corner, without having to move or re-align two or more of aids;

(b) transporting or carrying all the necessary aids to accurately check, for example a corner, is difficult and inconvenient;

(c) certain guides, such as plumb lines, are not particularly portable, and can be influenced by external factors, winds for example, thereby degrading the accuracy of the build; and (d) the aforementioned guides need to be re-aligned for each stage of a build, between each course of bricks for example.

PRINCIPAL OBJECTS AND ADVANTAGES OF THE INVENTION

The principal objects and advantages of the present invention include: providing an apparatus for setting level and plumb lines that solve one or more of the aforementioned problems; providing such an apparatus for setting level and plumb lines that comprises first and second beams hingedly connected to one another by way of a connector wherein the connector is arranged to allow the second beam to slide relative to the first beam; providing such an apparatus that includes a connector comprising first and second elements that are hingedly connected to one another wherein the first and second elements are adapted for cooperative engagement with a respective first and second beam and wherein the connector is arranged to slidably engage the first beam to allow the second beam to slide relative to the first beam; and generally providing such an apparatus for setting level and plumb lines that is reliable in performance, capable of long lasting life, and particularly well adapted for the proposed usages thereof.

Other objects and advantages of this invention will become apparent from the following description taken in conjunction with the accompanying drawings wherein are set forth, by way of illustration and example, certain embodiments of this invention.

SUMMARY OF THE INVENTION

The improvements of the present invention preferably include first and second beams that are substantially rigid and straight. The beams may be manufactured of any suitable material, although a rigid plastics material or a metal may be most suited to the invention. The beams may have any suitable cross-section, although it is envisaged that I-, T- or box-sections would be most suitable for most applications.

The beams preferably incorporate so called "spirit tubes," i.e., a transparent tube partially filled with a liquid, such that the orientation of the beams relative to the vertical and horizontal can be ascertained. Each beam may comprise one or more spirit tubes. Where more than one tube is provided with each beam, the tubes may be oriented at desired angles to one another. Desirable angles may be right angles or half-right angles. The spirit tube or tubes may be rotatable relative to the beam. Where the spirit tubes are rotatable relative to the beams, graduations may be provided to set desired angles relative to a datum or edge of the beam.

The first and second elements are conveniently referred to as body and head components. The body is slidable relative to the first beam, preferably by way of formations that engage with the profile of the first beam. The formations may be claws that partially surround the flange of a T- or I-section beam.

The body and head of the connector are preferably hingedly connected to one another by way of a pintle hinge. The body may have one or more wings that are arranged to retain a tongue component of the head. There may also be a pin that passes through the one or more wings and tongue. Alternatively, the wing or wings and tongue may comprise formations, a cup and cone arrangement for example, enabling the head to be "snapped" into engagement with the wings of the connector.

Where provided, the cup and cone arrangement may comprise a protrusion on the wing or wings and an aperture or recess formed in or on the tongue or vice-versa.

The head of the connector is also preferably adapted to engage the second beam. Most preferably, the head of the connector engages the end of the second beam. The head of the connector may be bifurcated in order to receive the second beam. The head may be affixed to the second beam by way of a pin, rivet or screw, etc., which passes through the head and the beam. Additionally or alternatively, the head and/or second beam may be provided with a cup and cone arrangement, whereby the second beam can be "snapped" into engagement with the head of the connector. Where provided, the cup and cone arrangement may comprise a protrusion on the head and an aperture or recess formed in or on the second beam.

The connector is preferably manufactured of a substantially rigid material, such as a plastics material or metal.

Where the connector is manufactured of a plastics material, it is preferably injection molded.

The tongue is preferably adapted to prevent the second beam from hinging relative to the first beam beyond a desired angle. The desired angle is preferably a right angle. The tongue may have an arcuate edge to enable it to be rotated and/or hinged relative to the first beam. The tongue may also have a seat that engages the first beam when the second bean is oriented at a desired angle relative to the first beam. The desired angle is preferably a right angle.

BRIEF DESCRIPTION OF THE DRAWING FIGURES

DETAILED DESCRIPTION OF THE PREFERRED EMBODIMENT

As required, embodiments of the present invention are disclosed herein, however, it is to be understood that the disclosed embodiments are merely exemplary of the invention, which may be embodied in various forms. Therefore, specific structural and functional details disclosed herein are not to be interpreted as limiting, but merely as a basis for claims and as a representative basis for teaching one skilled in the art to variously employ the present invention in virtually any appropriately detailed structure.

Figure 1:
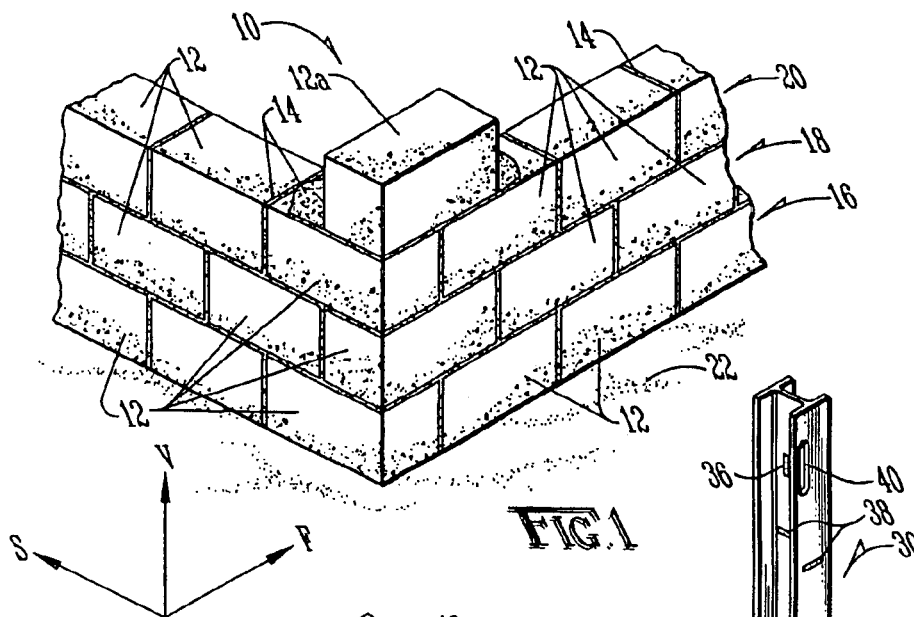
FIG. 1 shows a perspective view of a corner of a wall during construction.

Turning now to FIG. 1, a typical wall 10 is shown during construction. The wall 10 comprises a number of bricks 12, which are keyed to one another using mortar 14. The wall 10 is constructed by sequentially laying bricks 12 adjacent to one another, with mortar 12 between adjacent bricks. The wall is built layer-by-layer in courses 16, 18 and 20 on foundations (not shown) or on the ground 22. A corner of a wall is ideally "square," with each face parallel to the directions F, S and V, being mutually perpendicular.

Figure 2:
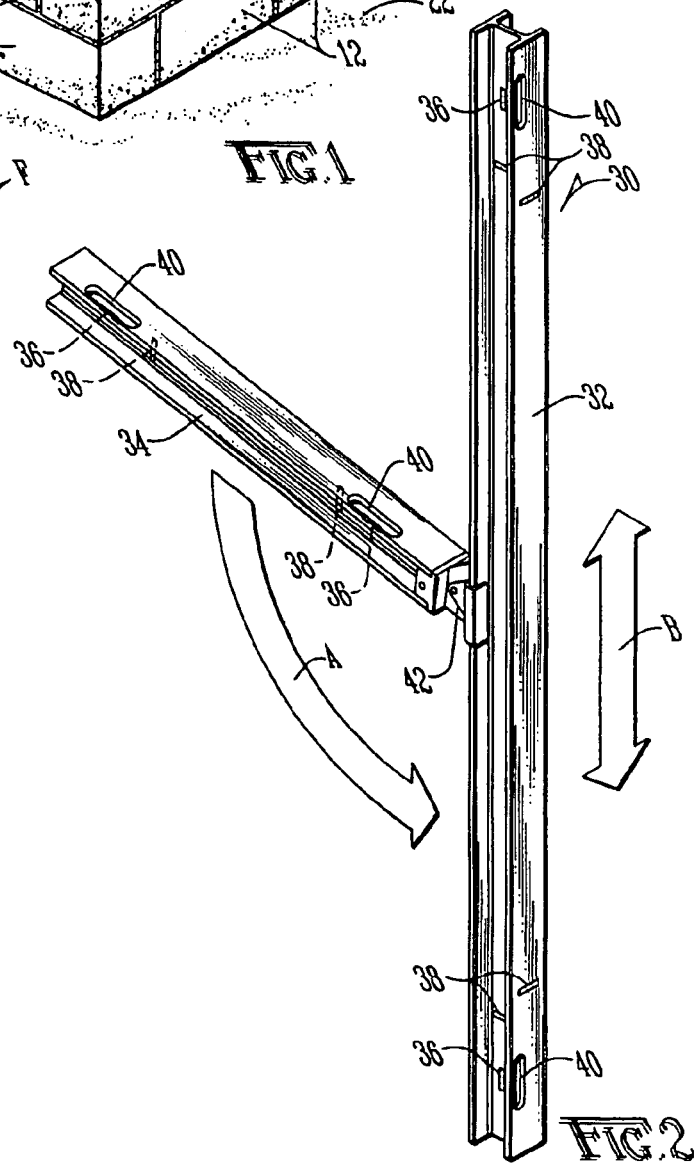
FIG. 2 shows a perspective view of a preferred embodiment of a combination level and plumb in accordance with the present invention.

FIG. 2 shows a combination level and plumb 30 according to the present invention, comprising first I-section beam 32 and second I-section beam 34. The beams 32 and 34 comprise spirit tubes 36 and 38, which are oriented parallel to and perpendicular to the longitudinal axis of each beam 32 and 34, respectively. The spirit tubes 36 and 38 are viewable from a variety of angles either directly or through apertures 40 cut into the beams 32 and 34.

The first beam 32 and second beam 34 are hingedly connected to one another by way of a sliding connector 42. The connector 42 enables the second beam 34 to hinge relative to the first beam 32 through a right angle, as indicated by arrow A. The connector 42 is also arranged to slide relative to the first beam 32 as indicated by arrow B.

In use, first beam 32 of the level and plumb 30 is aligned vertically V using the spirit tubes 38 aligned perpendicular to the longitudinal axis of the beam 32 against the wall 10. A brick 12a is then laid on a layer of mortar 12 on top of the preceding course 20 of bricks 12. The second beam 34 is then slid down to lie on top of the newly laid brick 12a. If the level and plumb 30 is opened fully, it will conveniently provide a set of mutually perpendicular reference axes, which are parallel to the vectors V, F and S.

Thus, the perpendicularity and alignment of the beams 32 and 34 can be easily checked using any appropriate ones of the conveniently located spirit tubes 36 and 38. The brick 12a can then be adjusted so that its edges lie parallel to the beams 32 & 34, and hence parallel to the ideal vectors V, F and S.

Further bricks 12 can then be added to the wall 10, each one being checked for alignment either individually, or as a course 20.

Figure 3:
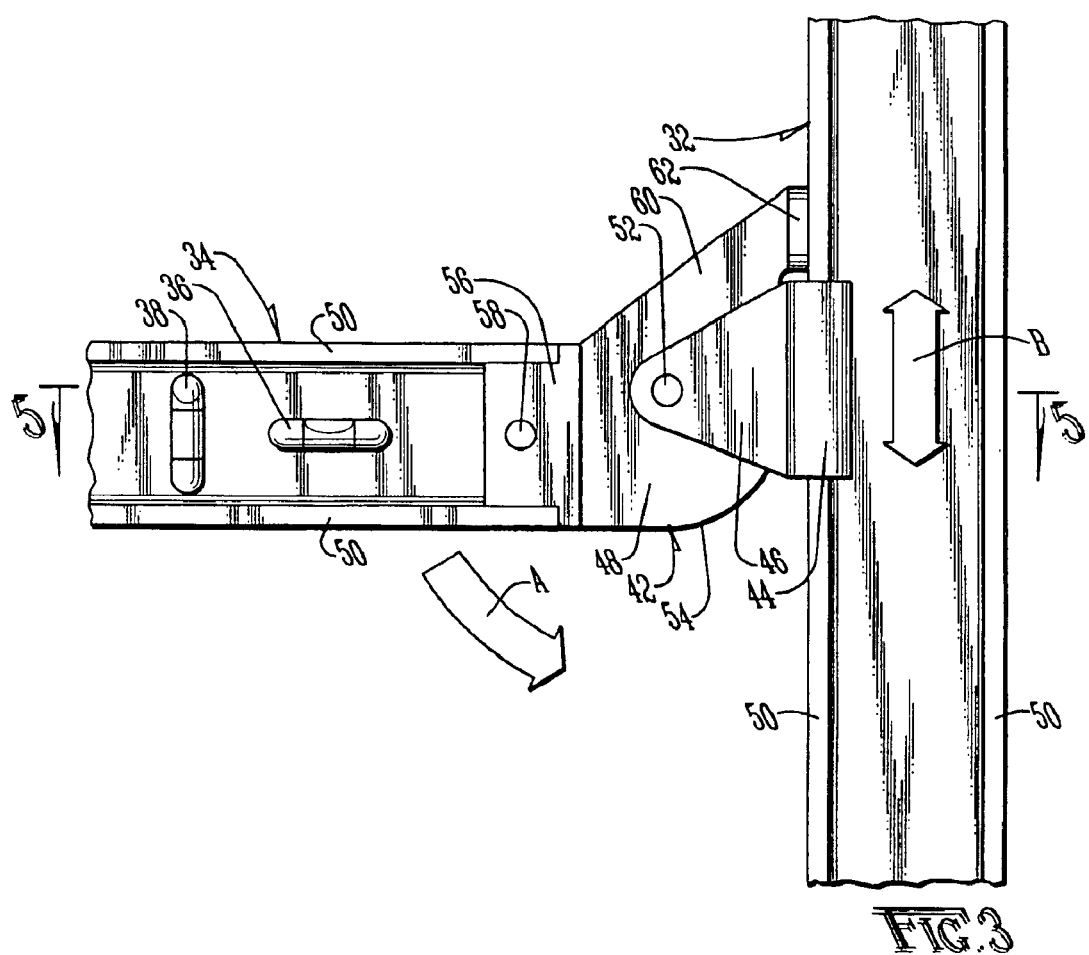
FIG. 3 shows an enlarged and fragmentary, side elevational view of a preferred embodiment of the combination level and plumb of the present invention in an open position.

FIG. 3 of the drawings shows a close up side view of the connector 42, which comprises a foot 44, a pair of wings 46 and a tongue 48. The foot 44 has claws 45 that engage flange 50 of the I-section of the first beam 32. This arrangement enables the foot 44 to slide along the first beam 32.

The foot 44 is connected to the pair of wings 46 that retain the tongue 48. The tongue 48 pivots relative to the pair of wings 46 about a pin 52. A leading edge 54 of the tongue 48 is arcuate about the axis of the pin 52. This enables the second beam 34 to hinge downwardly, as indicated by arrow A.

The tongue 48 is bifurcated 56, enabling it to engage the end of the second beam 34. A retaining pin 58 passes through the bifurcated ends 56 of the tongue 48 and the second beam 34 to lock the two components 34, 48 together.

Figure 6:
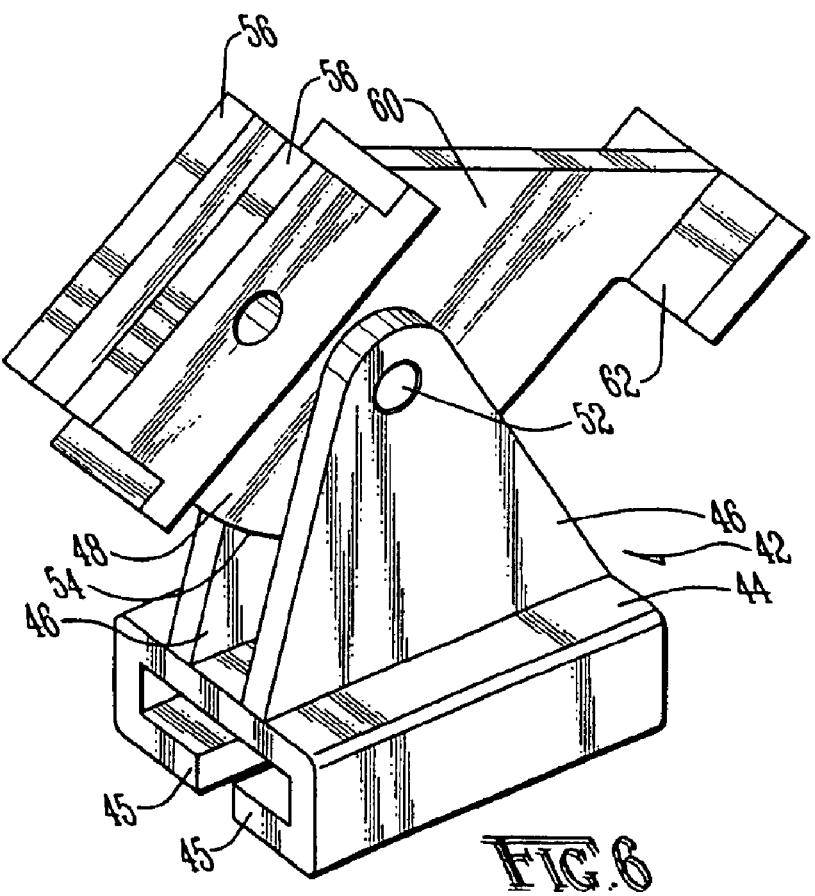
FIG. 6 shows an enlarged perspective view of a preferred embodiment of a connector of the combination level and plumb in accordance with the present invention.

The tongue 48 also has a flange 60 with a seat 62 at an end thereof, as shown in FIG. 6. The flange 60 prevents the second beam 34 from opening relative to the first beam 32 by more than a right angle. The seat 62 is provided to bolster the end of the flange 60 and to squarely contact the flange 50 of the first beam 32. Also shown in FIG. 3 are the spirit tubes 36 and 38, which are of conventional construction.

Figure 4:
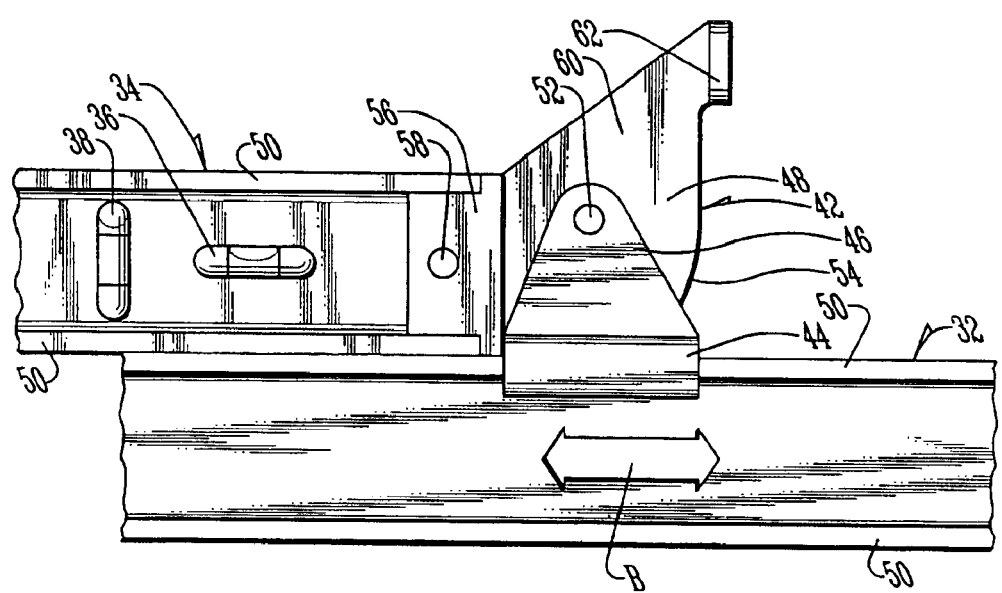
FIG. 4 shows an enlarged and fragmentary, side elevational view of a preferred embodiment of the combination level and plumb of the present invention in a folded position.

FIG. 4 of the drawings is similar to FIG. 3, but shows an enlarged side elevational view of the connector 42 in a folded position. As can be seen, the flange 60 and seat 62 of the connector 42 is free to rotate relative to the first beam 32 by virtue of the arcuate edge 54 of the tongue 48. The flanges 50 of the beams 32 and 34 lie adjacent and parallel to one another, and the foot 44 of the connector 42 remains free to slide relative to the first beam 32.

Figure 5:
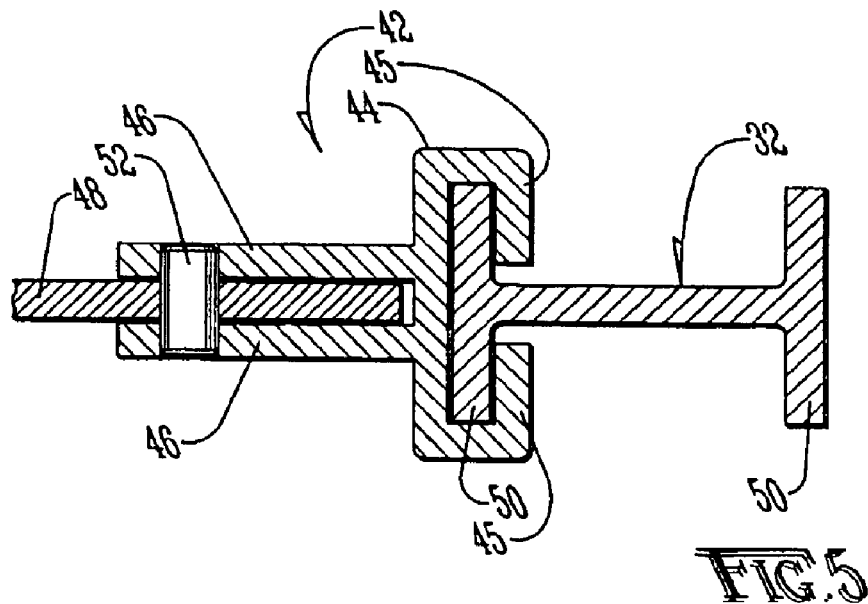
FIG. 5 shows an enlarged and fragmentary, cross-sectional view of the combination level and plumb of the present invention taken along line 5—5 of FIG. 3.

FIG. 5 shows, in partial section, how the claws 45 of the foot 44 of the connector 42 engage with the flanges 50 of the first beam 32. Further, it shows how the tongue 48 pivots about the pin 52, relative to the pair of wings 46 of the connector 42.

Finally, FIG. 6 shows a perspective view of the connector 42. For convenience, all reference numerals are equivalent to those as indicated in FIGS. 3, 4 and 5 above.

It is to be understood that while certain forms of the present invention have been illustrated and described herein, it is not to be limited to the specific forms or arrangement of parts described and shown.

What is claimed and desired to be covered by Letters Patent is as follows:

1. A combination level and plumb comprising:
  (a) a first I-section beam having
    (1) a longitudinal axis, (2) at least two spirit levels mounted on the first I-section beam, at least one of which is oriented parallel to the longitudinal axis of the first I-section beam and at least one of which is oriented perpendicular to the longitudinal axis of the first I-section beam, (3) apertures through the first I-section beam for viewing various ones of the at least two spirit levels therethrough, and (4) a flange;

(b) a second I-section beam having (1) a longitudinal axis, (2) at least two spirit levels mounted on the second I-section beam, at least one of which is oriented parallel to the longitudinal axis of the second I-section beam and at least one of which is oriented perpendicular to the longitudinal axis of the second I-section beam, (3) apertures through the second I-section beam for viewing various ones of the at least two spirit levels therethrough, and (4) an end; and (c) a connector including (1) a foot having claws structured to slidingly engage the flange of the first I-section beam, (2) a pair of wings affixed to the foot, and (3) a tongue including (A) a pin pivotally connecting the tongue to the pair of wings about an axis, (B) a leading edge arcuate about the axis of the pin, (C) a bifurcation including a retaining pin wherein the bifurcation is structured to engage the end of the second I-section beam and the retaining pin is structured to lock the bifurcation to the end of the second I-section beam, and (D) a tongue flange having an end and a seat structured to bolster the end of the flange and to squarely contact the flange of the first I-section beam, wherein the tongue flange is structured to prevent an angular displacement of the second I-section beam relative to the first I-section beam of greater than a right angle; and (d) wherein the connector hingedly connects the second I-section beam to the first I-section beam enabling the second I-section beam to be angularly displaced up to and including a right angle relative to the first I-section beam and wherein the connector allows the second I-section beam to slide along the first I-section beam.

* * * * *